United States Patent
Bobde et al.

(10) Patent No.: US 7,243,370 B2
(45) Date of Patent: Jul. 10, 2007

(54) METHOD AND SYSTEM FOR INTEGRATING SECURITY MECHANISMS INTO SESSION INITIATION PROTOCOL REQUEST MESSAGES FOR CLIENT-PROXY AUTHENTICATION

(75) Inventors: Nikhil P. Bobde, Bellevue, WA (US); Ann Demirtjis, Redmond, WA (US); Mu Han, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 10/151,747

(22) Filed: May 17, 2002

(65) Prior Publication Data

US 2003/0005280 A1    Jan. 2, 2003

Related U.S. Application Data

(60) Provisional application No. 60/298,239, filed on Jun. 14, 2001.

(51) Int. Cl.
G06F 7/04 (2006.01)
G06F 7/58 (2006.01)
(52) U.S. Cl. .......................................... 726/10; 726/21
(58) Field of Classification Search ................... 726/10, 726/12, 4, 5, 11, 14
See application file for complete search history.

(56) References Cited

U.S. PATENT DOCUMENTS

| | | | |
|---|---|---|---|
| 6,173,173 B1 | 1/2001 | Dean et al. | |
| 6,865,681 B2 * | 3/2005 | Nuutinen | 726/14 |
| 6,870,848 B1 * | 3/2005 | Prokop | 370/395.2 |
| 2002/0078153 A1 * | 6/2002 | Chung et al. | 709/204 |
| 2002/0120760 A1 * | 8/2002 | Kimchi et al. | 709/230 |
| 2002/0141358 A1 * | 10/2002 | Requena | 370/329 |
| 2002/0150226 A1 * | 10/2002 | Gallant et al. | 379/210.02 |
| 2002/0157019 A1 | 10/2002 | Kadyk et al. | |
| 2003/0009463 A1 * | 1/2003 | Gallant | 707/10 |
| 2003/0012382 A1 * | 1/2003 | Ferchichi et al. | 380/270 |
| 2003/0081791 A1 * | 5/2003 | Erickson et al. | 380/282 |
| 2003/0217164 A1 | 11/2003 | Buch | |

OTHER PUBLICATIONS

U.S. Appl. No. 60/276,923, filed Mar. 2001, Gallant.*
Song, D., "Kerberos on the Web: Protocoll Example," Internet Archive, Online!, May 11, 2001 (2 pages) http://web.archive.org/web/20010511171619.
Tschalar, R., et al., "Kerberos Authentication and Authentication (proxy ticket forwarding)," Apache Development Mailing List, Online!, Nov. 6, 1999 (3 pages) http://hypermail.linklord.com/new-httpd/old/1999/Nov/0106.html.

(Continued)

*Primary Examiner*—Kambiz Zand
*Assistant Examiner*—Aubrey H. Wyszynski
(74) *Attorney, Agent, or Firm*—Perkins Coie LLP

(57) ABSTRACT

A method and system is provided to integrate the Kerberos security mechanism into the message flow of the signaling operation under the Session Initiation Protocol to allow a SIP client and a SIP proxy to authenticate each other. When the SIP proxy receives an request message, such an INVITE request, from the SIP client, it responds with a challenge message indicating that authentication based on Kerberos is required. In response, the SIP client sends a second request message with a proxy authorization header containing authentication data, including a Kerberos server ticket for the Proxy, to allow the proxy to authenticate the client's user.

22 Claims, 8 Drawing Sheets

OTHER PUBLICATIONS

Handley, M. et al., "RFC 2543 SIP: Session Initiation Protocol," Network Working Group Request for Comments, Mar. 1999 (153 pages).

Nokia: UMTS AKA in SIP, Aug.4, 2000 (3 pages).

Byerly, B.J. et al., "SIP Authentication Using CHAP-Password," IETF Internet Draft, Oct. 2000 (12 pages).

Rosenberg, J., H. Schulzrinne, G. Camarillo, A. Johnston, J. Peterson, R. Sparks, M. Handley and E. Schooler, "SIP: Session Initiation Protocol - DRAFT RFC 2543," Internet Engineering Task Force, draft-ietf-sip-rfc2543bis—09.txt, Feb. 27, 2002, 243 pages.

"How PGP works," Chapter 1 of Introduction to Cryptography in the PGP 6.5.1 documentation, copyright 1999 Network Associates, http://www.pgpi.org/doc/pgpintro/, 23 pages last accessed Nov. 18, 2005.

La Tour, Irenee Dupre, "Chapters 7-9 of A Secure Authentication Infrastructure for Mobile Communication Services over the Internet," University of Ottawa Thesis, Mar. 2001, 71 pages.

* cited by examiner

US 7,243,370 B2

METHOD AND SYSTEM FOR INTEGRATING SECURITY MECHANISMS INTO SESSION INITIATION PROTOCOL REQUEST MESSAGES FOR CLIENT-PROXY AUTHENTICATION

RELATED CASES

This application claims the priority of U.S. Provisional Application No. 60/298,239, filed Jun. 14, 2001.

TECHNICAL FIELD OF THE INVENTION

This invention relates generally to communications between devices over a computer network, and more particularly to the integration of a security mechanism, such as one based on the Kerberos authentication protocol, into network communications that use the Session Initiation Protocol (SIP) as the signaling protocol for establishing a communication session.

BACKGROUND OF THE INVENTION

The Session Initiation Protocol (SIP) is a signaling protocol that provides a mechanism for a computing device to locate another device it wants to communicate with over a computer network and to establish a communication session therewith. SIP is a versatile protocol and has been used for establishing communication sessions in many different scenarios. For instance, SIP is used for Internet conferencing, telephony, presence, event notification, and instant messaging. An important strength of SIP is its support of personal mobility by providing the ability to reach a called party (user) under a single, location-independent address even when the called party has moved to a different computer.

One common mode of session initiation operation under the SIP is the "proxy mode." By way of example, a SIP client (the "caller") may send a SIP request message, such as an INVITE message, identifying the intended recipient (the "callee") by an e-mail like address. This request message is typically first sent to an outbound SIP proxy of the sending SIP client. The outbound SIP proxy then forwards the request message, often through other intermediate SIP proxies, to an SIP proxy with which the intended recipient client has registered, which then sends the INVITE to the recipient. The acceptance message ("200 OK") of the recipient client is returned through the signaling chain to the caller, which can then communicate with the callee through a media channel that is typically different from the signaling channel. Besides communicating with another SIP client, a SIP client may also talk to SIP servers for purposes such as registering itself with a SIP registrar by sending a REGISTER request.

Although SIP has been widely implemented for various applications, it was designed mainly for signaling operations. It does not explicitly provide or require a security mechanism for protecting the security and privacy of the communication sessions. In many cases, however, it is desirable to require a SIP client that sends a request to authenticate its user to an outbound SIP proxy, and to also require the proxy to authenticate itself to the SIP client. Moreover, it is also often necessary to protect the integrity of the SIP request messages. Both the client-proxy authentication and message integrity require the use of a reliable security mechanism. Thus, there is a need to combine a reliable security mechanism with the SIP signaling operation to allow authentication between a SIP client and an outbound SIP proxy. The technical challenge is, however, how to fit the desired security mechanism into the SIP signaling framework so that the two mechanisms for different purposes can be performed together effectively.

SUMMARY OF THE INVENTION

In view of the foregoing, the present invention provides a scheme to integrate a security mechanism, such as the Kerberos protocol or the NTLM protocol, into the message flow of the SIP signaling operation to allow a SIP client and a SIP proxy to authenticate each other. In accordance with the invention, when the proxy receives a SIP request message from the SIP client, it responds with a challenge message indicating that authentication according to a pre-selected security mechanism is required. In response, the SIP client sends a second, or revised, version of the request message with a proxy authorization header that includes authentication data for authenticating the client to the server according to the security mechanism. In the case where the Kerberos security mechanism is used, the proxy authorization header includes data representing a Kerberos server ticket obtained by the client for accessing the proxy. If the authentication of the client's user based on the proxy authorization header data is successful, the SIP proxy forwards the request through the SIP message signaling path between the SIP client and the intended recipient of the request message. If the SIP client requires mutual authentication, the SIP proxy adds a proxy authentication information header to the next message it sends to the client. This message may be, for example, a "200 OK" SIP response generated by a callee SIP client in response to an INVITE request or a "200 OK" response generated by a SIP registrar server in response to a REGISTER message. The proxy authentication information header contains the authentication data for the client to authenticate the SIP proxy.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
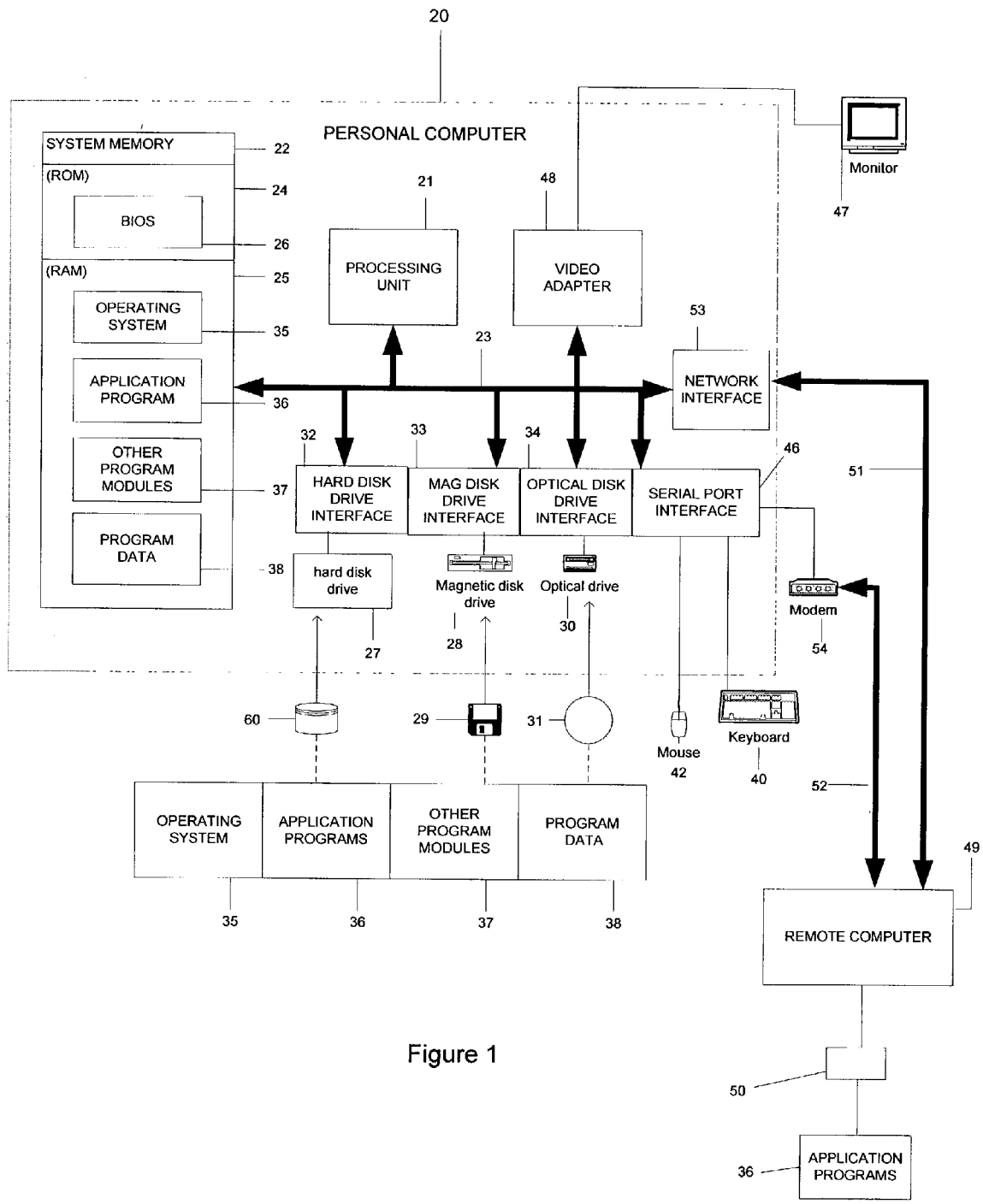
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2-9. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
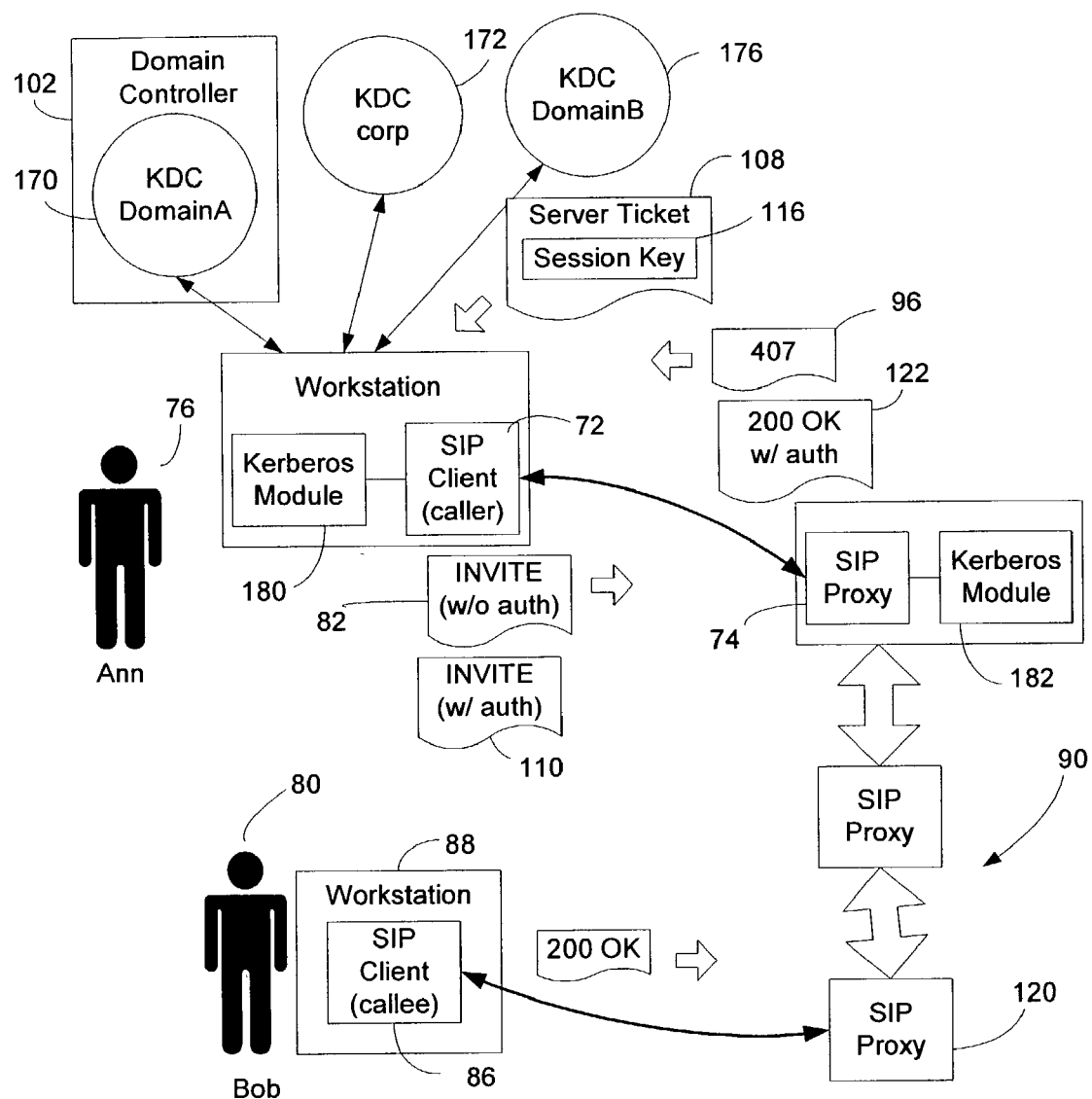
FIG. 2 is a schematic diagram showing a Session Initiation Protocol (SIP) system including a SIP client and a SIP proxy server that authenticate each other during a session signaling phase.

Referring now to FIG. 2, the present invention is directed to a way to integrate a security mechanism, especially one implementing the Kerberos authentication protocol, into the request messages under the Session Initiation Protocol (SIP) to enable a SIP client 72 and a SIP proxy server 74 to authenticate each other and for protecting the integrity of the signaling messages. The SIP is defined in Request For Comments (RFC) 2543, which is hereby incorporated by reference in its entirety.

By way of example, as shown in FIG. 2, in a typical session initiation operation, a user 76 (e.g., "Ann") of a SIP client 72 (the "caller") that wants to talk to another user 80 (e.g., "Bob") sends an INVITE message 82 that identifies Bob as the intended recipient for the INVITE. This INVITE is sent to an outbound proxy server 74 for the caller SIP client's domain. As shown in FIG. 2, the INVITE message may be passed through multiple SIP proxies involved in the signaling operation before it reaches the SIP client 86 (the callee) of Bob's computer 88. In a preferred embodiment, the security of the SIP signaling messages being transferred between the SIP proxies in the signaling path is protected by sending the messages under the IPSec protocol or through a pipe under the Secured Sockets Layer (SSL) protocol. It will be appreciated that although in this example the SIP request is an INVITE request, the authentication scheme described below can also be used for other types of SIP requests, such as REGISTER, MESSAGE, SUBSCRIBE, SERVICE, etc.

For ensuring the security of the signaling operation and the integrity of the signaling messages, the outbound SIP proxy server 74 may require authentication of the user 76 of the caller SIP client 72 before forwarding the INVITE message 82 through the signaling path 90. In accordance with the invention, referring now to FIG. 3, the proxy server 74 responds by sending a challenge message 96 to the SIP client 72. The challenge message 96 contains the status code "407 Proxy Authentication Required" as defined in the SIP specification for indicating that the client 72 has to first authenticate the user with the proxy 74. Pursuant to the SIP specification, the challenge message 96 (referred to hereinafter as the "407 message") includes a "Proxy-Authenticate" header field 98 that contains data indicating the security mechanism the client should use for authentication. The syntax and contents of the Proxy-Authenticate header is described in greater detail below. In a preferred embodiment, Kerberos is the preferred security mechanism, but the SIP framework also allows the use of the security mechanism based on the NTLM protocol. In the following description, it is assumed that a security mechanism based on the Kerberos protocol is used unless otherwise indicated.

Figure 3:
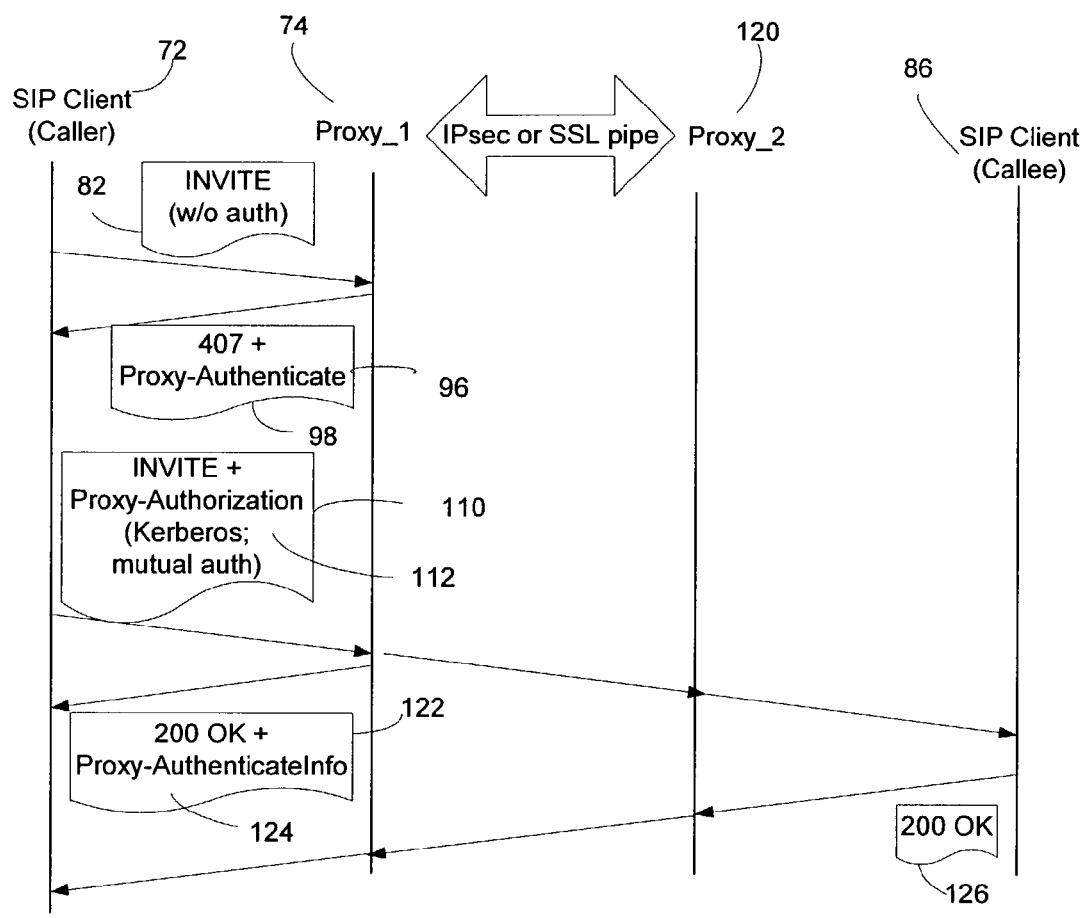
FIG. 3 is a schematic diagram showing exchange of signaling messages between the SIP client and the SIP proxy server for authentication purposes.

Still referring to FIG. 3, when the SIP client 72 receives the 407 message 96 from the proxy server 74 in response to the INVITE message 82, it decides from the Proxy-Authenticate header 98 that the proxy server requires authentication of the user by means of the Kerberos mechanism. The client 72 then obtains a server ticket 108 from a Kerberos Key Distribution Center (KDC) 100 for the SIP proxy server 74 if it has not already obtained one. In one implementation, the KDC 100 is part of the domain controller 102 for the proxy server 74. After obtaining the server ticket 108, the client 72 sends another INVITE message 110. This time, however, the INVITE message 110 includes a Proxy-Authorization header field 112, pursuant to the SIP specification. The Proxy-Authorization header field 112 includes the server ticket 108 for accessing the proxy, which includes the session key 116 to be used. The syntax and contents of the Proxy-Authorization. header field is described in greater detail below. Optionally, the Proxy-Authorization header may also include a request for mutual-authentication, i.e., asking the proxy server 74 to authenticate itself to the client 72.

When the SIP proxy server 74 receives the resent INVITE message 110 with the Kerberos server ticket embedded therein, it extracts the server ticket and verifies the validity of the ticket by decrypting it with its long-term key shared with the KDC 100. If the ticket is valid, the user 76 is authenticated, and the SIP proxy server 74 forwards the INVITE message 110 to the next proxy 120 on the signaling path. If the client 72 has requested mutual authentication in the Proxy-Authorization header 112 of the INVITE message 110, the proxy server 74 will sign future packets from the server to the client using a session key associated with the Kerberos server ticket. This message includes a Proxy-Authentication Information header 124 that contains the credentials of the proxy 74 to allow the client 72 to authenticate the proxy.

Ultimately, the INVITE message 110 reaches the callee, i.e., the SIP client 86 of Bob's computer 88. If the callee accepts the call invitation, it returns a "200 OK" message 126, which is then routed back to the caller. Once the call connection is established, the caller can communicate with the callee directly without having to go through the SIP proxies involved in the signaling phase.

Figure 4:
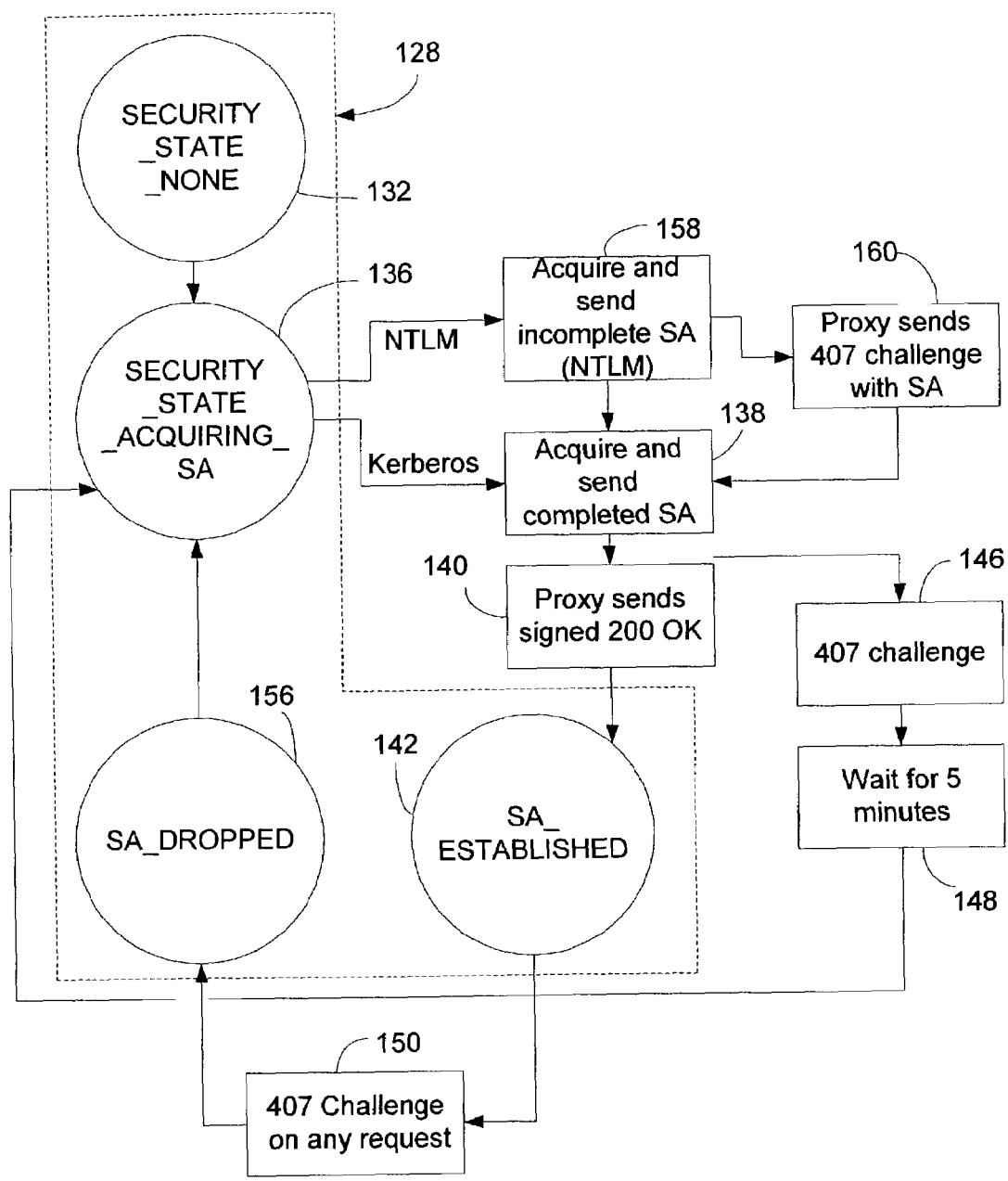
FIG. 4 is a schematic diagram showing a state machine representing the operation of security mechanisms in conjunction within the framework of SIP.
Figure 5:
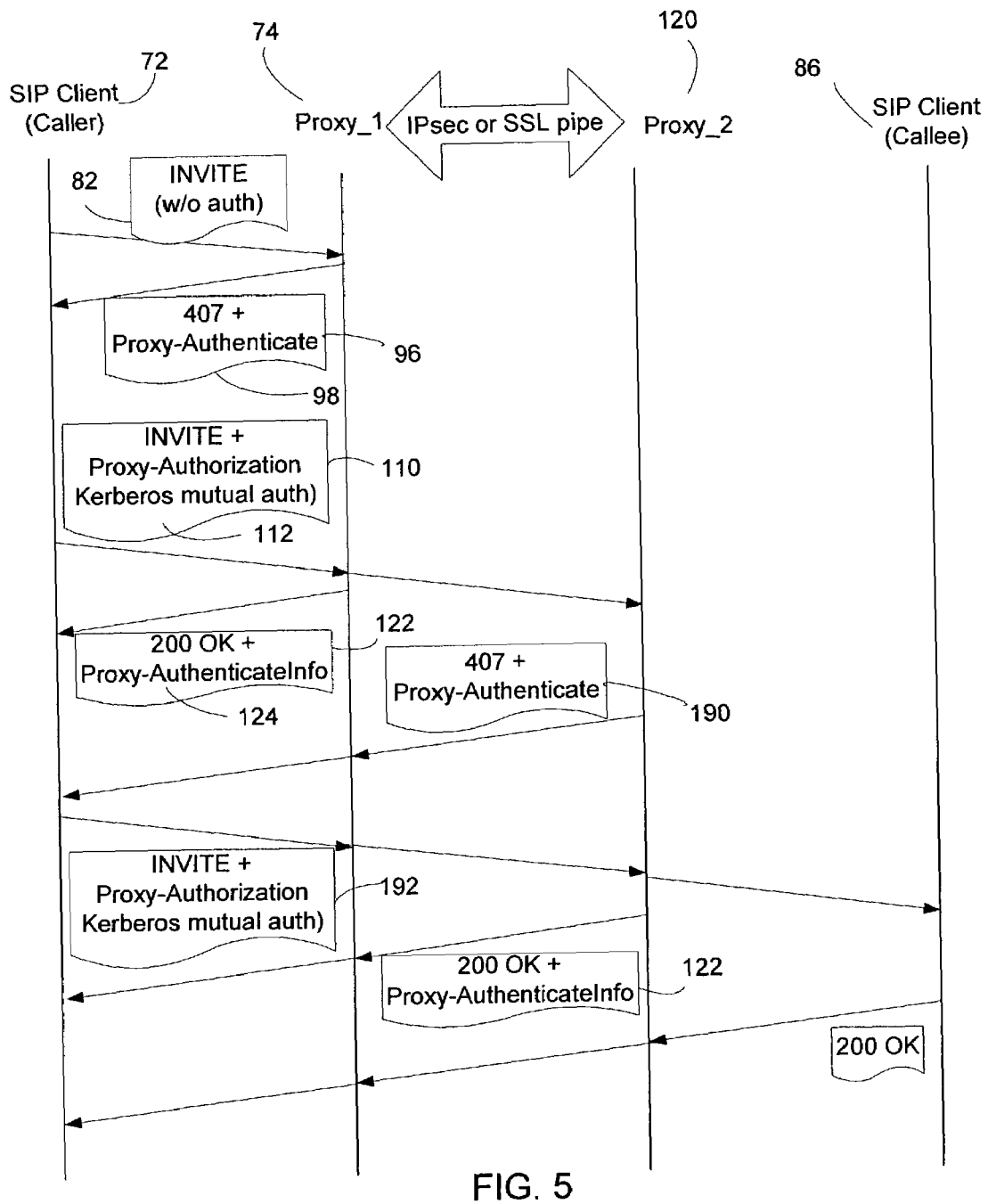
FIG. 5 is a schematic diagram showing exchange of signaling messages for the SIP client to perform authentication operations with multiple SIP proxies.

Referring now to FIG. 4, in accordance with the invention, the operation of establishing the authentication security association (SA) with between the SIP client 72 and the SIP proxy server 74 can be viewed as a state machine 128. In the embodiment shown in FIG. 4, the preferred security mechanism is Kerberos, but optionally the NTLM security mechanism can also be used, and the state machine diagram reflects the inclusion of that option.

In FIG. 4, the states are shown in circles, and the operations performed in connection with the states are shown in rectangular blocks. As shown in FIG. 4, one state in the state machine is the "SECURITY_STATE_NONE" state 132, in which no security SA has been established. When the client 72 receives a 407 challenge from the proxy 74 in response to an INVITE sent by the client or when the client decides to do a pre-authentication with the proxy, the client enters into a "SECURITY_STATE_ACQUIRING_SA" state 136, in which the client acquires the security association data required for authentication, which depends on the security mechanism selected.

Generally, the security association is defined as a state in which the client and the SIP proxy have exchanged a shared secret in a secure manner such that this secret can be used to authenticate and protect the integrity of any subsequent messages exchanged by the client and the proxy. If the security mechanism is Kerberos, the security association includes the Kerberos server ticket for the proxy and the session key. In the case of Kerberos, the obtained SA is complete, i.e., it is sufficient for the proxy to authenticate the user of the SIP client. The client then sends this SA-related information (e.g., Kerberos session key encrypted with the server's secret) to the proxy (step 138). If the proxy sends back a signed 200 OK message (step 140), the authentication is successful and the security association is established, i.e., the client is in the SA Established state 142. If, however, the proxy sends a 407 challenge instead (step 146), the client assumes that the proxy is in a bad state so that it cannot validate the client's good credentials. The client then waits for a "back-off" time (e.g., 5 minutes) before trying to send SIP messages again (step 148).

After entering the SA Established state 142, the client can send further messages to the proxy without having to do the authentication again, as long as the security association has not expired. If, however, the proxy sends a 407 challenge (step 150), the client assumes that the proxy has for some reason dropped the established security association. As a result, the client enters the SA Dropped state 156, and moves back to the SECURITY_STATE_ACQUIRING_SA state 136 to acquire a new SA for redoing the authentication with the proxy.

As mentioned above, the NTLM mechanism can be optionally selected for user authentication. The state migration for NTLM is largely identical to that for Kerberos, but with the difference that the NTLM acquires only a partial SA the first time (step 158), and sends the incomplete SA to the proxy in a first message. More specifically, in the case of NTLM, the first request from the client with the SA related information carries the client's security related capabilities (e.g., the version of the protocol it supports, the signing algorithms it supports, etc.) In response, the server sends a second 407 challenge (step 160) that contains its a own authentication data, including its NTLM related capabilities and a random byte string typically called "nonce". In response, the client signs a hash of its own name and the "nonce" value sent by the proxy using its credentials. This is handled internally by the NTLM implementation. The server verifies the client's authentication data and gets the session key with the help of the domain controller. If the SIP proxy is not the intended recipient, it then forwards the SIP request to the next hop in the signaling path, and signs the next message (e.g., a 200 OK message from the recipient) to the sender SIP client (step 140).

The syntax of the various SIP headers involved in the message exchange between the SIP client and the SIP proxy for authentication purposes is described below.

The 407 Response

As mentioned above, if the SIP proxy server 74 wants to challenge the identity of the SIP client (or its user) that sent an INVITE message, it sends a 407 message with a Proxy-Authenticate header back to the client. The syntax of Proxy-Authenticate header in a preferred embodiment requiring the use of the Kerberos security mechanism for authentication is as follows:

Proxy-Authenticate="Proxy-Authenticate" scheme kerb-challenge gssapi-data

| Scheme | = "kerberos" \| "NTLM" \| "Negotiate" |
|---|---|
| kerb-challenge | = 1#( realm \| targetname \| [ opaque ] \| qop-options \| ggssapi-data ) |
| targetname | = "targetname" "=" <"> URI ( 1*SP URI ) <"> |
| URI | = absoluteURI \| abs_path |
| opaque | = "opaque" "=" quoted-string |
| qop-options | = "qop" "=" <"> 1#qop-value <"> |
| qop-value | = "auth" \| "auth-int" \| token |
| gssapi-data | = "gssapi-data" "=" ( token \| quoted-string) |

The syntax of the Proxy-Authenticate header described here is similar to the "WWW-Authenticate Response Header" defined in IETF RFC 2617 entitled "HTTP Authentication: Basic and Digest Access Authentication," which is hereby incorporated by reference in its entirety. The optional parameters "algorithm" and "stale" have been dropped. The "scheme" field of the header allows the client to choose which authentication mechanism among the ones proposed by the server it wants to use to authenticate itself to the server. The client preferably chooses the Kerberos mechanism if it can support that mechanism, and otherwise chooses the NTLM authentication mechanism.

The realm parameter is the unique identifier of the SIP service provider to which the SIP proxy belongs and the client is trying to access. The realm string is displayed to the user to help her identify the correct set of credentials she needs to provide in order to authenticate. The "targetname" parameter is a always required and is used to carry the FQDN for the SIP proxy. The actual contents of this parameter help the client to keep track of which proxy it is establishing an SA with. It helps the proxy to determine whether the response is meant for itself or some other proxy. The "opaque" parameter is used by the server to index the particular SA being established and has to be echoed in any future Proxy-Authorization header the client generates for the SA, as will be described below.

In this embodiment, it is assumed that the Generic Security Service Application Programming Interface (GSS-API) as defined in IETF RFC 2078 (which is hereby incorporated by reference in its entirety) has been implemented and is used for securely exchanging messages between communicating applications. The GSS-API allows, among other things, a communicating application to authenticate the user associated with another application. The gssapi-data field in the Proxy-Authenticate header and the Proxy-Authorization header described below is for holding the data returned during the SA negotiation phase by the Security APIs that implement NTLM and Kerberos security packages. These APIs return the gssapi data that need to be sent from the client to the proxy and vice versa. The gssapi data are opaque to the SIP client and proxy implementation and are interpreted only by the security API. The qop parameter tells the client the level of security the server wants to client to adhere to. The qop parameter value is always set to "auth" indicating the security level provided by this mechanism is user authentication.

The following is an example of a Proxy-Authenticate header field:

Proxy-Authenticate: Negotiate
    realm = "Microsoft RTC Service provider",
    opaque = "ABCDEF456789"
    qop = "auth",
    gssapi-data = "ABCD345678yuikjhlbcdfsaqwety"

Typically the SIP proxy would challenge the identity of the SIP client if it is provisioned to allow only authorized clients and the incoming SIP packet from the client does not contain any signature. The SIP proxy would also challenge a client if it has lost the security association for this SIP URI (due a reboot, etc.). If there is a mismatch between the authorization parameters that the client is using and what the SIP proxy is expecting, the SIP proxy would challenge the client using a 407 message carrying the exact authorization parameters that SIP proxy wants the client to comply with.

Client's Response to a 407 Challenge

In response to a 407 challenge, the SIP client would try to generate a signature complying with the authentication parameters sent by the SIP proxy through the 407 challenge message. The SIP client would increment the Cseq value and resend the initial SIP request that was challenged along with the authorization information carried in a Proxy-Authorization request header. The syntax of the Proxy-Authorization request header in a preferred embodiment is as follows:

```
Proxy-Authorization = "Proxy-Authorization" ":" scheme kerb-
response realm message-qop targetname
    kerb-response  = 1#( [crand] | [response] | [opaque] |
                      [gssapi-data] )
    message-qop    = "qop" "=" qop-value
    crand          = "crand" "=" crand-value
    crand-value    = crand-value
    response       = "response" "=" request-digest
    request-digest = <"> 32LHEX <">
    LHEX           = "0" | "1" | "2" | "3" |
                     "4" | "5" | "6" | "7" |
                     "8" | "9" | "a" | "b" |
                     "c" | "d" | "e" | "f"
```

The syntax of the Proxy-Authorization header described here is similar to the "Authorization Request Header" defined in IETF RFC 2617, except that the optional parameters "algorithm" and "URI" have been dropped. The Proxy-Authorization header is added after the request URI and the Via headers The signature is computed using the session key across following fields:
  The From header URI
  The To header URI
  The From header tag
  The To header tag
  The "crand" parameter in the Proxy-Authorization or the "srand" parameter in the Proxy-Authentication-Info header
  The Expires value in the SIP message Expires header.

The message body of the SIP message is not included in the signature. A proxy-authorization header contains either the gssapi-data parameter or the response (signature) parameter.

The following are examples of a Proxy-Authorization header in a client's response to a 407 challenge:

```
Proxy-Authorization: Negotiate
    realm = "Microsoft RTC Service Provider",
    response = "ABCD87564cvx",
    opaque = "ABCD1234",
    crand = "1234"
    qop = "auth"
    targetname = "server1.domainA.microsoft.com"
```

OR

```
Proxy-Authorization: Negotiate
    realm = "Microsoft RTC Service Provider",
    opaque = "ABCD1234",
    gssapi-data = "ABCDEF123456",
    gop = "auth",
    targetname = "server1.domainA.microsoft.com"
```

Besides responding to a 407 challenge from the proxy, the client would also send this header when it registers with the SIP proxy for the first time. The Proxy-Authorization header would contain the "gssapi-data" parameter when the SIP client registers with the proxy server and is in the process of initializing a security association for a session.

Mutual Authentication

Establishing a mutual authentication between the SIP proxy and the SIP client might be required in certain deployment scenarios. The client finds out from the provisioning profile it has for the particular proxy server whether mutual authentication is required or not. If the mutual authentication is enabled, the client initializes its security association for mutual authentication, using the standard version of the GSS API. Also, if mutual authentication is enabled, the server needs to sign every packet it sends to the SIP client. This signature is carried in the Proxy-Authentication-Information request header. The syntax of the Proxy-Authenticate-Information is as follows:

```
ProxyAuthenticationInfo = "Proxy-Authentication-Info" ":"
                           auth-info
    auth-info       = 1#( message-qop| response-auth | srand )
        response-auth = "rspauth" "=" response-digest
    response-digest = <"> *LHEX <">
    srand           = "srand" "=" srand-value
    srand-value     = quoted-string
```

The "rspauth" parameter in the Proxy-Authentication-Info header carries the signature (of the authenticating proxy) for this response. The "srand" parameter is used by the server after the SA establishment phase to sign the messages it sends to the client. This parameter is a random string generated by the server itself and is used to introduce an element of randomness in the hash/signature of the message generated.

The following is an example of the Proxy-Authentication-Information:

```
Proxy-Authentication-Info: Negotiate
    realm="Microsoft RTC Service Provider",
    qop = "auth",
    rspauth  = "ABCD87564cvx",
    srand  = "9876543210",
    targetname="server1.domainA.microsoft.com"
```

Generally, in the SIP framework, a SIP client may establish a security association with a SIP proxy during a registration process using a REGISTER request. The registration allows the SIP client to receive messages from the SIP proxy. When the SIP client registers with the SIP proxy, it can at the same time authenticate its user with the SIP proxy server by sending the authentication data, such as a Kerberos ticket, along in the REGISTER message. If the SIP client has already registered and authenticated itself with the SIP proxy, when the client sends a SIP request, such as an INVITE, the request message from the client will be signed using the Kerberos session key exchanged during the SA establishing process.

Nevertheless, a SIP client is not required to register with the server before it can send out a request message to the SIP proxy. In the case where the caller has not authenticated itself with the proxy (even if the SIP client has already registered with the proxy), the SIP proxy does not forward the request to the next hop. Instead, the proxy sends a challenge to the SIP client.

The challenge indicates that the client needs to establish a security association with this SIP server. The client can establish the SA by resending the request with the security association data, or alternatively it can do so by refreshing its registration with this server if one is already in place but the SA has not been established. Establishing the SA using the registration refresh and then sending the SIP request with a valid signature has the advantage that it also makes sure that the registration is in a good state.

Also, every time a SIP client un-registers with SIP proxy, the security association (SA) between the two is lost and a new security association has to be negotiated again. Moreover, when the registration of a SIP client expires, the proxy server will remove its corresponding security context from its list of SAs. Every time a SIP client refreshes its registration it has to refresh the authentication security association.

In a preferred embodiment that uses a security mechanism based on the Kerberos protocol, a Kerberos ticket is requested from a Kerberos Key Distribution Center (KDC) every time the SIP client registers with the SIP proxy if the authentication of the user of the sending SIP client is required by the SIP proxy/registrar. When the SIP client receives the Kerberos ticket, it decrypts this ticket. The decrypted ticket contains the session key and some other properties of this Kerberos session. This ticket also contains the session key and other session related parameters encrypted with the server's credentials. This part is returned in a pOutput parameter in the gssapi-data field and is sent in the re-INVITE request to the proxy.

To facilitate a clear understanding of the operation of the security mechanism within the framework of SIP, a particular example of client-to-proxy Kerberos authentication is described below with reference to FIG. 2. In this example, it is assumed that the SIP proxy server 74 has created a shared secret key with the KDC 170 in the domain "domainA.Microsoft.com: S_server1", where "server1" is used in this example as the code name for a SIP proxy/registrar. The KDC 170 knows the proxy server 74 as server_ID=server1.domainB.microsoft.com. The proxy server 74 also acquires a credentials handle to be ready to respond to an incoming authentication request from the client. Server credentials are used to authenticate the proxy server 74 to the SIP client 74 in security protocols that support server authentication or mutual authentication. The proxy server 74 obtains a handle to its credentials defined by the service account used to start the server. It does so by calling the function AcquireCredentialsHandle of the Security Support Provider Interface (SSPI).

In the example of FIG. 2, the user 76 of the SIP client 72 is Ann. Ann has an account in an NT domain and logs on her account when she starts the day with the following information:
User_ID/principal name=ann@microsoft.com
Preferred_email=ann@microsoft.com
User_domain=domainA.Microsoft.com
Workstation=ann1.domainA.Microsoft.com When Ann wants to call Bob, she starts the SIP client 72 on her workstation 78 (the SIP client may start automatically as a service but should run in the security context of the user). The SIP client 72 finds its outbound proxy server 74 using DNS. The outbound proxy server 74 to use in this example is identified as Server1.domainB.Microsoft.com. Ann indicates that she wants to talk to bob@microsoft.com. Her SIP client 72 then sends an INVITE message 82 to Server1.domainB.Microsoft.com. The INVITE message includes the following information:
INVITE bob@microsoft.com
From: ann@microsoft.com
To: bob@microsoft.com For purposes of keeping the description of the example concise and clear, not all data contained in this INVITE message or other messages exchanged in the signaling processing are shown. The SIP proxy server 74 has been configured to require that all INVITE requests be authenticated for calls made to the Microsoft.com user name space. As a result, the SIP proxy server 74 responds to the INVITE by sending a 407 message 96 asking the SIP client 74 to use Kerberos to authenticate the user, Ann. The 407 message includes the following data:
Proxy-Authenticate: Kerberos
  realm=domainB.Microsoft.com
  targetname="server1.domainA.Microsoft.com"
  opaque="someopaquedata"

The opaque value is initialized by the proxy to identify the security context to use for this call. To that end, the proxy server 74 calls the function AcceptSecurityContext at this time and returns in opaque the base 64 encoded result of pOutput. The opaque value is used by the client and server to identify a security context to use for a particular server for the purposes of authentication continuation or re-authentication of subsequent requests to the same server using the Authorization request header.

When the SIP client 72 on Ann's workstation gets the 407 message 96 indicating that authentication is required, it checks if it has a valid session key for talking to Server1.domainB.Microsoft.com. If it does not have one yet, it needs to contact the KDC in its domain to get a session key for accessing the outbound SIP proxy. In this example, the client knows from the realm specified in the 407 message that the proxy is in a different domain than its own.

To establish a secured connection to the proxy server 74, the client 72 acquires an outbound credentials handle before sending an authentication request to the proxy. This is performed by calling functions of SSPI. The SSPI provides the means for networked applications to call one of several security support providers (SSP) to establish authenticated connections and to exchange data securely over those connections. There are two client-side SSPI functions involved in the authentication setup. The AcquireCredentialsHandle function obtains a reference to previously obtained logon credentials. The function InitializeSecurityContext creates the initial authentication request security tokens. The call to initializeSecurityContext passes in the pInput the opaque value obtained from the 407 message. The client sets a tfContextReq parameter of the function to request MUTUAL_AUTH. A pfContextAttr pointer is the way the Kerberos module 180 tells the client that mutual-auth has been "requested". This information is part of the KERB_AS_REQ created by the Kerberos module 180 of the client and passed in a secBuffer (pOutput) that tells the server (here the SIP proxy) the client wants mutual authentication. Since this is part of the KERB request, there is no need for a SIP mechanism (header/parameter) to request mutual authentication.

In the example shown in FIG. 2, calling the API function InitializeSecurityContext causes the following Kerberos logic to happen. First, the client 72 asks the KDC 170 for the domainA.Microsoft.com domain to give it a server ticket to the Proxy server 74 in DomainB. The KDC 170 for domainA.Microsoft.com sends the client 72 a referral ticket to the KDC 172 for corp.Microsoft.com. This referral ticket is encrypted in the inter-domain key shared by the two KDCs. With the referral ticket, the client asks the KDC 172 for corp.Microsoft.com to give it a server ticket to the server in DomainB.

In response, the KDC 172 sends the client a referral ticket to the KDC 176 for DomainB. This ticket is encrypted in the inter-domain key the KDC 172 shares with the DomainB KDC 176. The client then asks the KDC 176 for DomainB to give it a ticket to the proxy server 74 in DomainB. The KDC 176 sends back a server ticket 108 for accessing the proxy server 74. The KDC 176 encrypts one copy of this session key with Ann's logon session key, and embeds another copy of the session key in the server ticket, along with Ann's authorization data, and encrypts the server ticket with the proxy server's long-term key. The KDC 176 then sends these credentials back to the client 72 in a Kerberos Ticket-Granting Service Reply (KRB_TGS_REP).

The call to InitializeSecurityContext thus causes the Kerberos module 180 of the client machine to initiate a TGS exchange with the KDC. The value returned by this exchange is the session key for signing messages to be sent to the proxy.

Thereafter, the SIP client 72 creates a new INVITE message 110 (also called the "re-INVITE" message) to be sent to the SIP proxy. This new INVITE message 110 includes a proxy-authorization header as described above, with the GSS-API data therein containing the server ticket the client received from the KDC 176. The session key is the value returned in the pOutput buffer returned by the InitializeSecurityContext call. Thus, the new INVITE message 110 includes the following data:

INVITE bob@microsoft.com
From: ann@microsoft.com
To: bob@microsoft.com
Proxy-authorization: gss-scheme opaque gssapi-rdata
Opaque=someopaquedata
Gssapi-rdata=base64 {pOutput}=session key to the proxy This INVITE does the equivalent of a KRB_AP_REQ to the proxy server.

To protect the integrity of the messages and authenticate itself (i.e., prove the source of the message), the client signs the INVITE message 110 with the session key. Otherwise a third party could sniff the INVITE, get the Opaque and Gssapi-data values and send a bogus INVITE to the same server to make a call between itself and whatever destination it chooses. This means a client's authentication could be "stolen" for as long as the session key to the server is valid (8 hrs by default). Signing the INVITE doesn't stop a third party from grabbing the Opaque and Gssapi-rdata, but it can stop that party from creating a new INVITE to call whomever it wants. The server would have to be configured to only accept signed requests for this problem to be avoided.

The client 72 uses the MakeSignature API and calls it for setting the phcontext to the security context used in this call (the one identify in the opaque of the 407) and passing the content to sign in pMessage. The output of this call is the signed message returned in pMessage. The client adds the signature to the INVITE 110. When the proxy server 74 receives the resent INVITE message 110, it checks the opaque value in the Proxy-Authorization header and correlates it with a given phContext value (handle to a given security context). It takes the gssapi-rdata out and passes it to its Kerberos module 182 by calling the AcceptSecurityContext API function and passing the gssapi-rdata value obtained from the proxy-authorization header in the pInput component of the API function. The Kerberos module 182 decrypts the server ticket using the long-term key of the proxy, and extracts Ann's authorization data and the session key. It uses the session key to decrypt Ann's authenticator and then evaluates the timestamp inside.

If the authenticator passes the test, the Kerberos module 182 looks for a mutual authentication flag in the client's request. If the flag is set, the Kerberos module 182 uses the session key to encrypt the time from Ann's authenticator and returns the result in a Kerberos Application Reply (KRB_AP_REP). This causes the call to AcceptSecurityContext to return a SEC_E_OK return value with the authenticator passed through the API using the pOutput buffer. Once the user is authenticated, the SIP proxy/registrar will process the request and forward the INVITE message to the next hop in the SIP signaling path.

The SIP component of the Proxy then uses the next message it forwards to the SIP client to pass to the client the proxy's authenticator so that the client can authenticate the server. In the illustrated example, the message is a "200 OK" message. This message is not originated by the SIP proxy. Rather, the 200 response is generated by the callee in response to the INVITE request. The SIP proxy merely signs it with the session key before forwarding this response to the caller.

As described above, the authenticator is in the Proxy-Authentication-Information header. The header also includes the opaque value for the client to match this response to the right security context.

When the SIP client 72 on Ann's workstation receives the "200 OK" message, it extracts the Proxy-Authentication-Information header and calls InitializeSecurityContext with the phContext value set top the value in opaque and the pInput buffer set to response-digest. The Kerberos module 180 on the client decrypts the proxy's authenticator with the session key it shares with proxy and compares the time returned by the proxy with the time in the client's original authenticator. If the times match, the call to InitializeSecurityContext will return a SEC_E_OK and the client knows that the proxy is genuine. Else, the client should drop the call. There is no point in sending a CANCEL to kill the call since the client cannot trust the server to do anything it asks it to do.

In the example described above, the authentication occurs in a scenario in which the SIP first sends an INVITE without authentication, and then sends the authentication data in another INVITE in response to a 407 message from the proxy indicating that authentication is required. Alternatively, the client can include the required authentication data in the first INVITE sent to the proxy. To that end, the client 72 obtains the server ticket for the proxy from the KDC 176 before it is used by the user to make a call under SIP. The authentication data required are then put in the Proxy-Authorization request header as described above. Doing this avoids the need for the proxy to send the 407 challenge to the client to ask for authentication data. Also, even though only one SIP proxy is involved in the example of authentication operation described above, there are typically multiple SIP proxies in the SIP signaling path between the caller and the callee, and more than one of them may require the caller's client for authentication. For instance, in the simplified case shown in FIG. 5, there is another SIP proxy server 120 in additional to the outbound proxy server 74 of the SIP client, and both proxies require client authentication before forwarding the INVITE message. In this case, the client 72 first goes through the same process as described above in connection with FIG. 4 to authenticate itself with the outbound SIP server 74. After the proxy server 74 authenticates the client, it sends the INVITE to the second proxy 120, which then sends a 407 challenge 190 to the client. In response, the client sends another new INVITE 192 with a Proxy-Authorization header containing a Kerberos server ticket for the second Proxy server 120. After authenticating the client, the second proxy passes the INVITE 192 to the callee.

Figure 6:
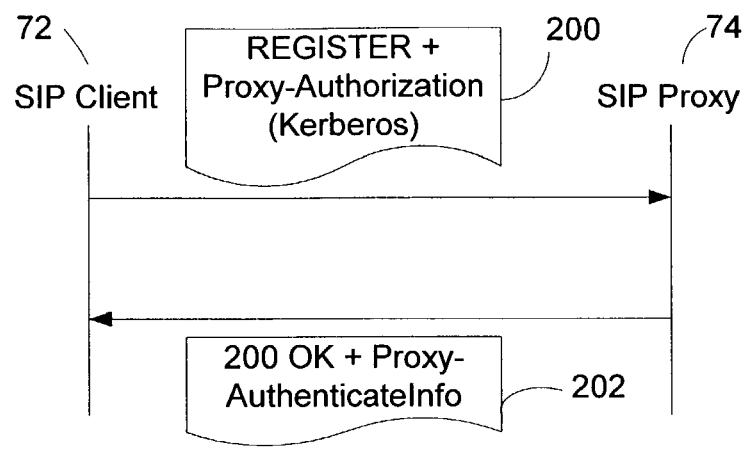
FIG. 6 is a schematic diagram showing the message flow in a process of pre-authentication between the SIP client and the proxy using the Kerberos security mechanism.

The following description provides additional examples of how the Proxy Authenticate, Proxy Authorization, and Proxy-Authentication Information headers are used in scenarios of different message flows for performing authentication based on the Kerberos or NTLM security mechanism. Turning to FIG. 6, in this case, the SIP client 72 performs a Kerberos-based pre-authentication when the client registers with the proxy server. The client sends a REGISTER request 200 that includes a Proxy-Authorization header containing the Kerberos server ticket for the proxy and a request for mutual authentication as described above. After authenticating the client based on the server ticket, the proxy returns a 200 OK message 202 with a Proxy Authentication Information header containing the proxy's authentication data that the client can use to authenticate the proxy. Exemplary contents of the REGISTER and 200 OK messages are as follows.

```
REGISTER sip:nickn@microsoft.com SIP/2.0
    Via: SIP/2.0/UDP www.xxx.yyy.zzz:5060
    From: "Nick North" <sip:nickn@microsoft.com>
    To: "Mark Mars" <sip:markmmarkm@microsoft.com>
    Call-ID: 123456789@microsoft.com
    CSeq: 1 REGISTER
    Contact: <sip:123.45.67.89:5060>
    Proxy-Authorization: Negotiate
realm="Microsoft RTC Service Provider", qop = "auth", gssapi-
data = "34fcbaed78902QWERTY", targetname=
"server1.doaminA.microsoft.com"
    User-Agent: Microsoft-RTC/1.0
    Content-Length: 0
    Via: SIP/2.0/UDP www.xxx.yyy.zzz:5060
    Proxy-Authentication-Info: Negotiate qop= auth, rspauth=
"ABCD87564cvx", srand = "9876543210" realm="Microsoft RTC
Service Provider" targetname="server1.doaminA.microsoft.com"
    From: "Nick North" <sip:nickn@microsoft.com>
    To: "Mark Mars" <sip:markm@microsoft.com>
    Call-ID: 123456789@ms.com
    CSeq: 1 REGISTER
    Contact: "Nick North" <sip:@www.xxx.yyy.zzz>
    User-Agent: Microsoft-RTC/1.0
    Content-Length: 0
```

Figure 7:
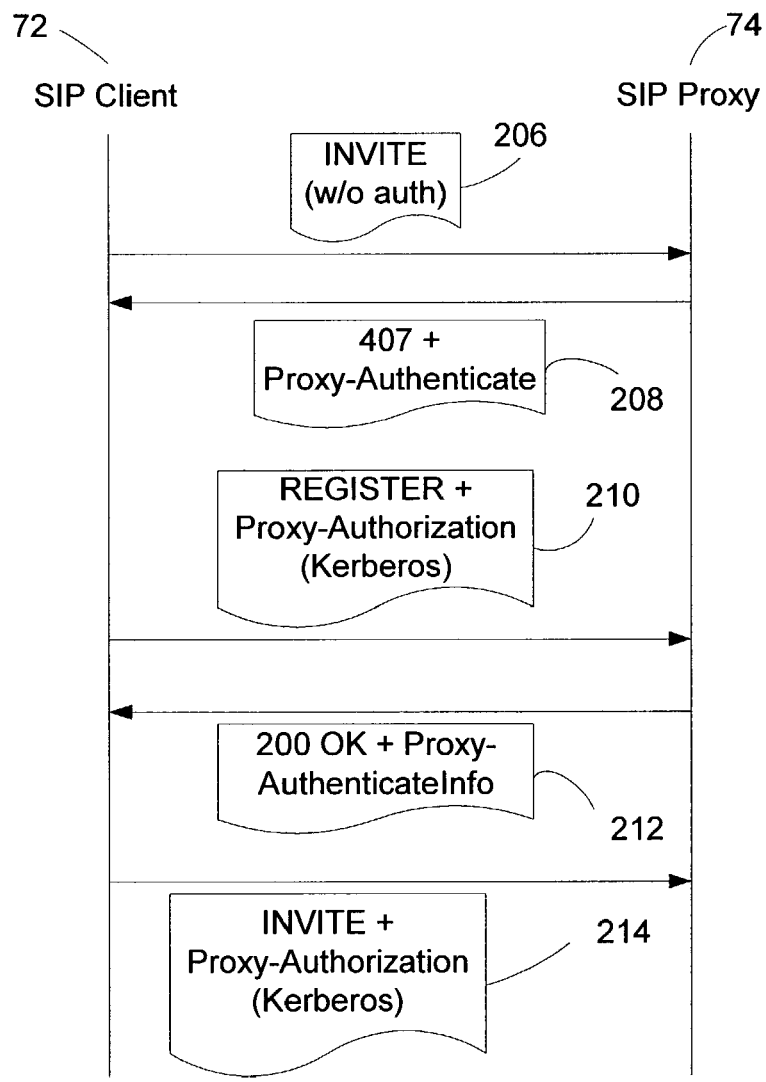
FIG. 7 is a schematic diagram showing the message flow in a challenged-authentication process between the SIP client and the proxy using the Kerberos security mechanism.

FIG. 7 shows a scenario of Kerberos-based challenged authentication. In this example, the client 72 first sends an INVITE 206 without any Proxy-Authorization information to the proxy 74. The proxy responds with a 407 message 208 with an Proxy-Authenticate header to indicate that authentication is requires. In respond to the 407 message, the client sends a REGISTER request 210 with a Proxy-Authorization header containing the required Kerberos authentication data. The Proxy returns a "200 OK" message 212 with a Proxy Authentication Information header containing authentication information about the proxy itself. After authenticating the proxy based on the data in the Proxy Authentication Information header, the client sends a second INVITE 214 with the Proxy-Authorization header. Exemplary messages in this process are provided below.

```
SIP/2.0 407 Proxy Authorization Required
    Via: SIP/2.0/UDP www.xxx.yyy.zzz:5060
    From: "Nick North" <sip:nickn@microsoft.com>
    To: "Mark Mars" <sip:markm@microsoft.com>
    Call-ID: 12345600@PC1.ms.com
    CSeq: 1 INVITE
    Proxy-Authenticate: Negotiate realm="Microsoft RTC Service
Provider", targetname =" server1.doaminA.microsoft.com", qop =
"auth"
    Contact: <sip:123.45.67.89:5060>
    User-Agent: Microsoft-RTC/1.0
    Content-Length: 0
```

-continued

```
REGISTER sip:nickn@microsoft.com SIP/2.0
    Via: SIP/2.0/UDP www.xxx.yyy.zzz:5060
    From: "Nick North" <sip:nickn@microsoft.com>
    To: "Mark Mars" <sip:markm@microsoft.com>
    Call-ID: 123456789@microsoft.com
    CSeq: 1 REGISTER
    Contact: <sip:123.45.67.89:5060>
    Proxy-Authorization: Negotiate  realm="Microsoft RTC
Service Provider", opaque= "ABCD1234",  qop = "auth", gssapi-
data = "34fcbaed78902QWERTY"
targetname="server1.domainA.microsoft.com"
    User-Agent: Microsoft-RTC/1.0
    Content-Length: 0
SIP/2.0 200 OK
    Via: SIP/2.0/UDP www.xxx.yyy.zzz:5060
    Proxy-Authentication-Info: Negotiate qop= "auth",
    rspauth= "ABCD87564cvx", srand = "9876543210"
targetname="server1.doaminA.microsoft.com" realm="Microsoft
RTC Service Provider",
    From: "Nick North" <sip:nickn@microsoft.com>
    To: "Mark Mars" <sip:markm@microsoft.com>
    Call-ID: 123456789@ms.com
    CSeq: 1 REGISTER
    Contact: <sip:123.45.67.89:5060>
    User-Agent: Microsoft-RTC/1.0
    Content-Length: 0
```

Figure 8:
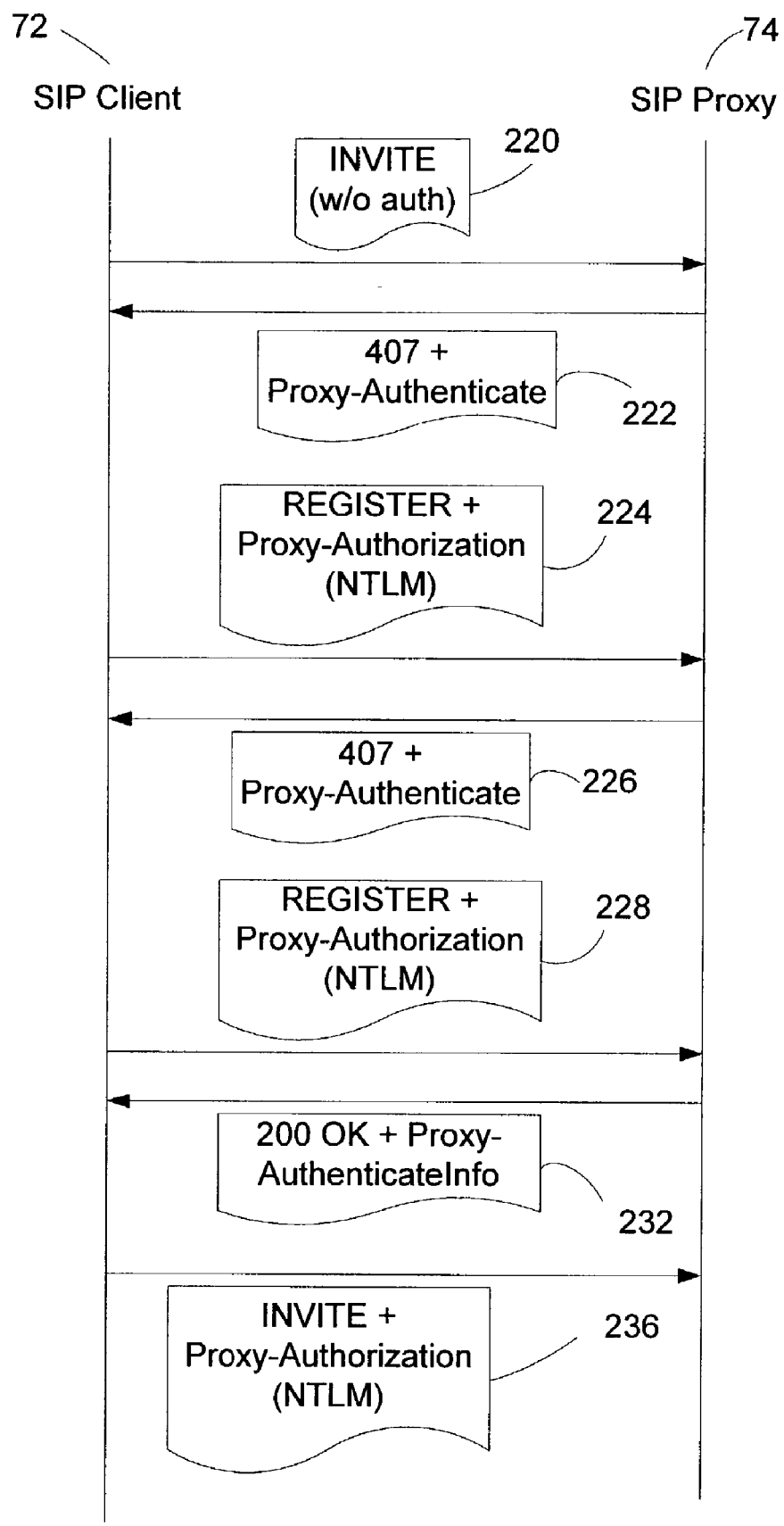
FIG. 8 is a schematic diagram showing the message flow in a challenged-authentication process between the SIP client and the proxy using the NTLM security mechanism.

Turning now to FIG. 8, as mentioned above, in a preferred embodiment the NTLM security mechanism can be optionally used for the client-proxy authentication. In this case, the client first sends an INVITE message 220 without authentication data, and the proxy returns a 407 message. The Proxy Authenticate header of this 407 message 222 indicates that NTLM should be used for authentication. The client then sends a REGISTER message 224 with a Proxy Authentication header containing the authentication data of the client according to the NTLM protocol.

As mentioned above in connection with the state machine of FIG. 4, the authentication data sent by the client allows the proxy to authenticate the client but the security association is not completely established based on the authentication data, so the proxy sends another 407 challenge 226 to the client, again with a Proxy Authenticate header. The client then sends another REGISTER request 228, with a Proxy Authorization header containing the authentication data required to complete the security association. The proxy server completes the security association based on the data in the second REGISTER request and returns a "200 OK" message 232 with a Proxy Authentication Information header containing authentication data about the proxy. Based on the authentication data in the "200 OK" message 232, the client authenticates the proxy, and then sends out another INVITE message 236. Exemplary messages for this process are provided below.

```
SIP/2.0 407 Proxy Authorization Required
    Via: SIP/2.0/UDP www.xxx.yyy.zzz:5060
    From: "Nick North" <sip:nickn@microsoft.com>
    To: "Mark Mars" <sip:markm@microsoft.com>
    Call-ID: 12345600@PC1.ms.com
    CSeq: 1 INVITE
    Proxy-Authenticate: NTLM realm="Microsoft RTC Service
Provider", targetname="server1.domainA.microsoft.com",
opaque="ABCD1234", qop = "auth"
    Contact: <sip:123.45.67.89:5060>
    User-Agent: Microsoft-RTC/1.0
    Content-Length: 0
REGISTER sip:nickn@microsoft.com SIP/2.0
    Via: SIP/2.0/UDP www.xxx.yyy.zzz:5060
```

-continued

```
      From: "Nick North" <sip:nickn@microsoft.com>
      To: "Mark Mars" <sip:markm@microsoft.com>
      Call-ID: 123456789@microsoft.com
      CSeq: 1 REGISTER
      Contact: <sip:123.45.67.89:5060>
      Proxy-Authorization: NTLM realm="Microsoft RTC Service
Provider", opaque="ABCD1234",  qop = "auth", gssapi-data =
"34fcbaed78902QWERTY"
targetname="server1.domainA.microsoft.com"
      User-Agent: Microsoft-RTC/1.0
      Content-Length: 0
SIP/2.0 407 Proxy Authorization Required
      Via: SIP/2.0/UDP www.xxx.yyy.zzz:5060
      From: "Nick North" <sip:nickn@microsoft.com>
      To: "Mark Mars" <sip:markm@microsoft.com>
      Call-ID: 12345600@PC1.ms.com
      CSeq: 1 INVITE
      Proxy-Authenticate: NTLM realm="Microsoft RTC Service
Provider", targetname=" server1.domainA.microsoft.com",
opaque="ABCD1234", qop = "auth",
      gssapi-data = "QWERTY789564NMJHKLasdcfg"
      Contact: <sip:123.45.67.89:5060>
      User-Agent: Microsoft-RTC/1.0
      Content-Length: 0
REGISTER sip:nickn@microsoft.com SIP/2.0
      Via: SIP/2.0/UDP www.xxx.yyy.zzz:5060
      From: "Nick North" <sip:nickn@microsoft.com>
      To: "Mark Mars" <sip:markm@microsoft.com>
      Call-ID: 123456789@microsoft.com
      CSeq: 2 REGISTER
      Contact: <sip:123.45.67.89:5060>
      Proxy-Authorization: NTLM realm="Microsoft RTC Service
Provider", gssapi-data = "qqertyuioKMNFO09876" opaque=
"ABCD1234",  qop = "auth",
targetname="server1.domainA.microsoft.com"
      User-Agent: Microsoft-RTC/1.0
      Content-Length: 0
SIP/2.0 200 OK
      Via: SIP/2.0/UDP www.xxx.yyy.zzz:5060
      Proxy-Authentication-Info: NTLM realm="Microsoft RTC
Service Provider" qop= "auth",
      rspauth= "ABCD87564cvx",  srand = "9876543210"
targetname="server1.domainA.microsoft.com"
      From: "Nick North" <sip:nickn@microsoft.com>
      To: "Mark Mars" <sip:markm@microsoft.com>
      Call-ID: 123456789@ms.com
      CSeq: 2 REGISTER
      Contact: <sip:123.45.67.89:5060>
      User-Agent: Microsoft-RTC/1.0
      Content-Length: 0
INVITE sip: markm@proxy1.wcom.com  SIP/2.0
      Via: SIP/2.0/UDP www.xxx.yyy.zzz:5060
      Proxy-Authorization: NTLM realm="Microsoft RTC Service
Provider", crand="913082051",
response="12345ABCDEF78909BCADE56", opaque=
"ABCD1234",  qop = "auth", targetname=
"server1.domainA.microsoft.com"
      From: "Nick North" <sip:nickn@microsoft.com>
      To: "Mark Mars" <sip:markm@microsoft.com>
      Call-ID: 12345601@PC1.ms.com
      CSeq: 2 INVITE
      Contact: "Nick North" <sip:nickn@microsoft.com>
      User-Agent: Microsoft-RTC/1.0
      Content-Type: application/sdp
      Content-Length: xxx
```

Figure 9:
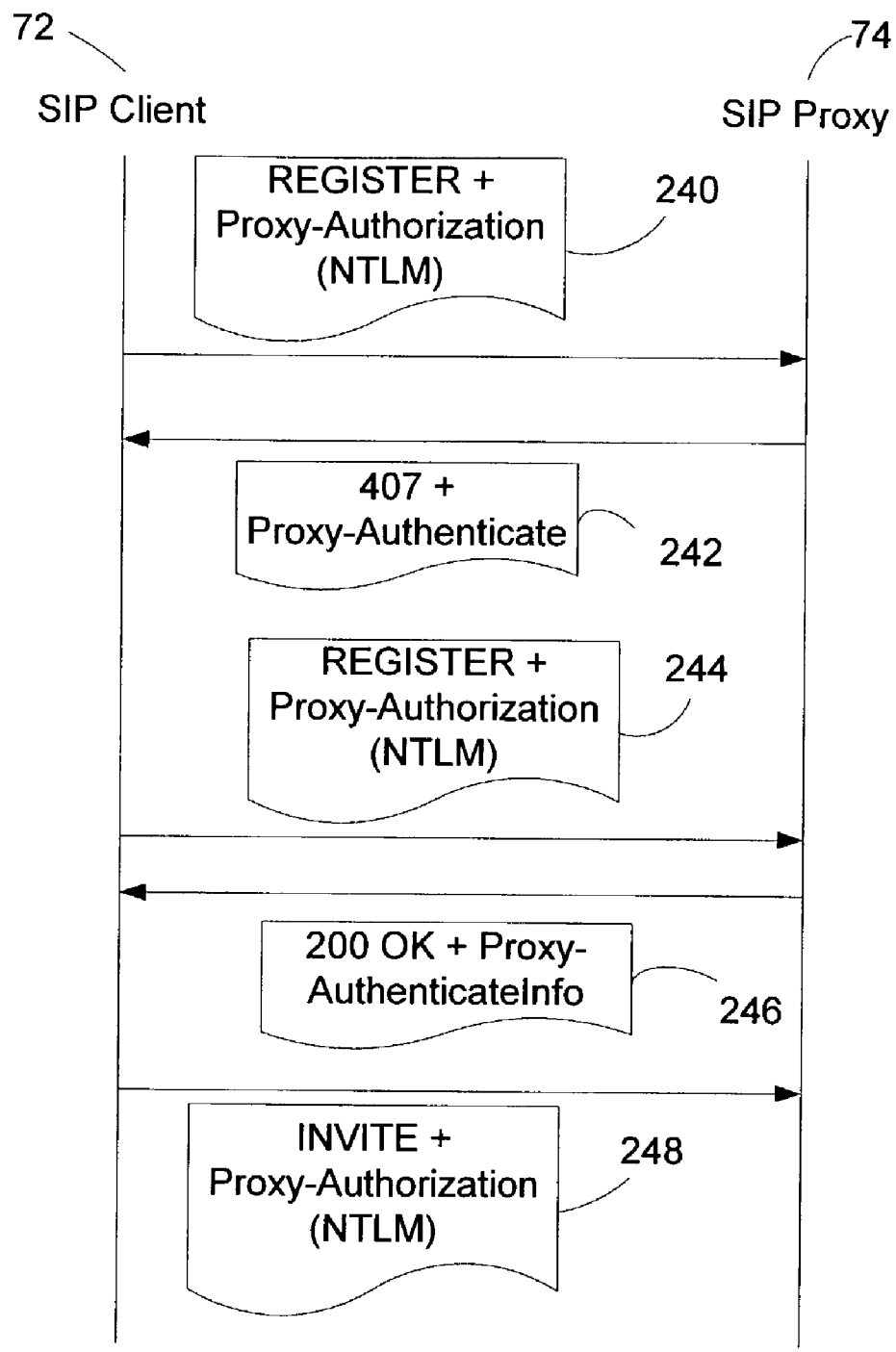
FIG. 9 is a schematic diagram showing the message flow in a process of pre-authentication between the SIP client and the proxy using the NTLM security mechanism.

FIG. 9 shows a scenario of NTLM-based pre-authentication. The message flow of this case is similar to that of the Kerberos-based pre-authentication, but with the addition of a 407 challenge and a REGISTER message. Specifically, the client sends a REGISTER message 240 containing a Proxy Authorization header that indicates that NTLM is used and contains NTLM authentication data and a request for mutual authentication. The proxy authenticates the client based on the received NTLM authentication data and returns a 407 challenge 242 with a Proxy Authenticate header. The client then sends a second REGISTER request 244 with a Proxy Authorization header containing the NTLM authentication data for completing the security association with the proxy. The proxy then returns a "200 OK" message 246 with Proxy Authentication Information. After authenticating the proxy, the client sends a second INVITE message 248 to the proxy. Exemplary messages for this process are provided below.

```
REGISTER sip:nickn@microsoft.com SIP/2.0
      Via: STP/2.0/UDP www.xxx.yyy.zzz:5060
      From: "Nick North" <sip:nickn@microsoft.com>
      To: "Mark Mars" <sip:markm@microsoft.com>
      Call-ID: 123456789@microsoft.com
      CSeq: 1 REGISTER
      Contact: <sip:123.45.67.89:5060>
      Proxy-Authorization: NTLM realm="Microsoft RTC Service
Provider", opaque= "ABCD1234",  qop = "auth", gssapi-data =
"34fcbaed78902QWERTY",
targetname="server1.domainA.microsoft.com"
      User-Agent: Microsoft-RTC/1.0
      Content-Length: 0
SIP/2.0 407 Proxy Authorization Required
      Via: SIP/2.0/UDP www.xxx.yyy.zzz:5060
      From: "Nick North" <sip:nickn@microsoft.com>
      To: "Mark Mars" <sip:markm@microsoft.com>
      Call-ID: 12345600@PC1.ms.com
      CSeq: 1 INVITE
      Proxy-Authenticate: NTLM realm="Microsoft RTC Service
Provider", targetname =" server1.domainA.microsoft.com",
opaque="ABCD1234", qop = "auth",
      gssapi-data = "QWERTY789564NMJHKLasdcfg",
targetname="server1.domainA.microsoft.com"
      Contact: <sip:123.45.67.89:5060>
      User-Agent: Microsoft-RTC/1.0
      Content-Length: 0
REGISTER sip:nickn@microsoft.com SIP/2.0
      Via: SIP/2.0/UDP www.xxx.yyy.zzz:5060
      From: "Nick North" <sip:nickn@microsoft.com>
      To: "Mark Mars" <sip:markm@microsoft.com>
      Call-ID: 123456789@microsoft.com
      CSeq: 2 REGISTER
      Contact: <sip:123.45.67.89:5060>
      Proxy-Authorization: NTLM realm="Microsoft RTC Service
Provider",gssapi-data = "qqertyuioKMNFO09876" opaque=
"ABCD1234",  qop = "auth",
targetname="server1.domainA.microsoft.com"
      User-Agent: Microsoft-RTC/1.0
      Content-Length: 0
SIP/2.0 200 OK
      Via: SIP/2.0/UDP www.xxx.yyy.zzz:5060
      Proxy-Authentication-Info: NTLM qop= "auth",
      rspauth="ABCD87564cvx",  srand= "9876543210",
targetname="server1.domainA.microsoft.com"
      From: "Nick North" <sip:nickn@microsoft.com>
      To: "Mark Mars" <sip:markm@microsoft.com>
      Call-ID: 123456789@ms.com
      CSeq: 2 REGISTER
      Contact: <sip:123.45.67.89:5060>
      User-Agent: Microsoft-RTC/1.0
      Content-Length: 0
INVITE sip: markm@proxy1.wcom.com SIP/2.0
      Via: SIP/2.0/UDP www.xxx.yyy.zzz:5060
      Proxy-Authorization: NTLM realm="Microsoft RTC Service
Provider", crand="913082051",
response="12345ABCDEF78909BCADE56", opaque= "ABCD1234",
qop = "auth" targetname="server1.domainA.microsoft.com"
From: "Nick North" <sip:nickn@microsoft.com>
To: "Mark Mars" <sip:markm@microsoft.com>
Call-ID: 12345601@PC1.ms.com
CSeq: 2 INVITE
Contact: "Nick North" <sip:nickn@microsoft.com>
User-Agent: Microsoft-RTC/1.0
Content-Type: application/sdp
Content-Length: xxx
```

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for mutual authentication between a Session Initiation Protocol ("SIP") client and a SIP proxy in connection with initiating a session through the SIP proxy, the method comprising:
    sending from the SIP client to the SIP proxy a first invite request;
    in response to the SIP proxy receiving the first invite request, sending to the SIP client a challenge that includes a SIP proxy security context;
    in response to the SIP client receiving the challenge,
        obtaining from a domain controller of the SIP client a session key of the SIP proxy and a server ticket, the session key encrypted with a key of the SIP client, the server ticket encrypted with a long-term key of the SIP proxy and including authentication data of the SIP client;
        decrypting the session key based the key of the SIP client; and
        sending to the SIP proxy a second invite request signed by the session key and that includes the server ticket and the SIP proxy security context;
    in response to receiving at the SIP proxy the second invite request,
        decrypting the server ticket based on the long-term key of the SIP proxy;
        when the authentication data of the SIP client in the server ticket indicates that the SIP client is authentic, the security context included in the second invite request matches the SIP proxy security context, and the second invite request is signed by the session key, sending to an intended server an invite request based on the second invite request;
        upon receiving from the intended server a response to the invite request, signing the response with the session key; and
            forwarding the signed response to the SIP client so that SIP client authenticates the SIP proxy.

2. The method of claim 1 wherein the SIP proxy creates the session key.

3. The method of claim 2 wherein the SIP proxy provides the session key to its domain controller, which provides the session key to the domain controller of the SIP client.

4. The method of claim 1 wherein the server ticket includes the session key.

5. The method of claim 1 wherein upon receiving at the SIP client the signed response, confirming that the response is signed with the session key.

6. A computer-readable medium embedded with instructions for controlling a computer system to provide mutual authentication between a Session Initiation Protocol ("SIP") client and a SIP proxy in connection with initiating a session through the SIP proxy, by a method comprising:
    receiving from the SIP client a first invite request;
    providing to an intermediary computer a session key;
    in response receiving the first invite request, sending to the SIP client a challenge that includes a SIP proxy security context;
    receiving at the SIP proxy a second invite request signed by a session key that includes an encrypted server ticket and a security context, the server ticket including authentication data;
    decrypting the server ticket based on a long-term key of the SIP proxy;
    when the authentication data in the server ticket indicates that the SIP client is authentic, the security context included in the second invite request matches the SIP proxy security context, and the second invite request is signed by the session key, sending to an intended server an invite request; and
    upon receiving from the intended server a response to the invite request, signing the response with the session key and forwarding the signed response to the SIP client so that SIP client authenticates the SIP proxy.

7. The computer-readable medium of claim 6 wherein the server ticket includes the session key.

8. The computer-readable medium of claim 6 wherein the intermediary computer provides the session key to the SIP client.

9. The computer-readable medium of claim 6 wherein the intermediary computer is a domain controller of the SIP proxy and the domain controller of the SIP proxy provides the session key to a domain controller of the SIP client.

10. The computer-readable medium of claim 6 wherein the SIP client in response to receiving the challenge,
    obtains from the intermediary computer the session key of the SIP proxy and the server ticket, the session key encrypted with a key of the SIP client, the server ticket encrypted with the long-term key of the SIP proxy and including authentication data of the SIP client;
    decrypts the session key based the key of the SIP client; and
    sends to the SIP proxy the second invite request signed by the session key and that includes the server ticket and the SIP proxy security context.

11. A computer-readable medium embedded with instructions for controlling a computer system to provide mutual authentication between a Session Initiation Protocol ("SIP") client and a SIP proxy in connection with initiating a session through the SIP proxy, by a method comprising:
    sending to the SIP proxy a first invite request;
    receiving from the SIP proxy a challenge that includes a SIP proxy security context;
    in response to the SIP client receiving the challenge,
        obtaining from an intermediary computer of the SIP client a session key of the SIP proxy and a server ticket, the server ticket encrypted with a long-term key of the SIP proxy and including authentication data of the SIP client so that the SIP proxy can authenticate the SIP client; and
        sending to the SIP proxy a second invite request signed by the session key and that includes the server ticket and the SIP proxy security context;
    receiving from the SIP proxy a response to the second invite request; and
    verifying that the response was signed by the session key to authenticate the SIP proxy.

12. The computer-readable medium of claim 11 wherein the server ticket includes the session key.

13. The computer-readable medium of claim 11 wherein the intermediary computer of the SIP client obtains the session key from an intermediary computer of the SIP proxy.

14. The computer-readable medium of claim 13 wherein the intermediary computers are domain controllers.

15. The computer-readable medium of claim 11 wherein the SIP client and the SIP proxy are in different domains.

16. The computer-readable medium of claim 11 wherein the SIP proxy authenticates the SIP client based on the authentication data of the server ticket.

17. The computer-readable medium of claim 11 wherein the SIP proxy upon receiving the second invite request, decrypts the server ticket based on a long-term key of the SIP proxy;

when the authentication data in the server ticket indicates that the SIP client is authentic, the security context included in the signed invite request matches the SIP proxy security context, and the second invite request is signed by the session key, sends to an intended server an invite request;

upon receiving from the intended server a response to the invite request, signs the response with the session key and forwards the signed response to the SIP client so that SIP client authenticates the SIP proxy.

18. The computer-readable medium of claim 15 wherein the SIP proxy receives from the SIP client the first invite request, provides to the intermediary computer the session key, and sends to the SIP client a challenge that includes the SIP proxy security context.

19. A method for mutual authentication between a Session Initiation Protocol ("SIP") client and a SIP proxy in connection with initiating a session through the SIP proxy, the method comprising:

sending from the SIP client to the SIP proxy a first invite request;

upon receiving at the SIP proxy the first invite request, sending to the SIP client a challenge that includes a SIP proxy security context;

upon receiving at the SIP client the challenge, sending to the SIP proxy a second invite request signed by a session key provided by the SIP proxy via an intermediary computer and that includes a server ticket and the SIP proxy security context, the server ticket including authentication data of the SIP client;

upon receiving at the SIP proxy the second invite request, when the authenticate data of the SIP client in the server ticket indicates that the SIP client is authentic, the security context included in the second invite request matches the SIP proxy security context, and the second invite request is signed by the session key, sending to an intended server an invite request based on the second invite request; and upon receiving from the intended server a response to the invite request, signing the response with the session key and forwarding the signed response to the SIP client; and upon receiving at SIP client the response, verifying that the response is signed with the session key to authenticate the SIP proxy.

20. The method of claim 19 wherein the SIP client encrypts the server ticket with a long-term key of the SIP proxy and the SIP proxy decrypts the server ticket based on the long-term key of the SIP proxy.

21. The method of claim 19 wherein the SIP proxy provides the session key to the intermediary computer.

22. The method of claim 19 wherein when the SIP proxy and SIP client are in different domains, the SIP proxy provides the session key to an intermediary computer of the domain of the SIP proxy which provides the session key to an intermediary computer of the domain of the SIP client which provides the session key to the SIP client.

* * * * *